US012008049B2

(12) United States Patent
Falco et al.

(10) Patent No.: US 12,008,049 B2
(45) Date of Patent: Jun. 11, 2024

(54) TECHNIQUES FOR VISUALIZING DEPENDENCIES IN A DATA ANALYTICS SYSTEM

(71) Applicant: Palantir Technologies Inc., Palo Alto, CA (US)

(72) Inventors: Xavier Falco, Cooper City, FL (US); James Campbell, Brooklyn, NY (US)

(73) Assignee: Palantir Technologies Inc., Denver, CO (US)

(*) Notice: Subject to any disclaimer, the term of this patent is extended or adjusted under 35 U.S.C. 154(b) by 54 days.

(21) Appl. No.: 17/384,966

(22) Filed: Jul. 26, 2021

(65) Prior Publication Data
US 2022/0004577 A1 Jan. 6, 2022

Related U.S. Application Data

(63) Continuation of application No. 15/782,647, filed on Oct. 12, 2017, now Pat. No. 11,074,300.
(Continued)

(51) Int. Cl.
*G06F 16/00* (2019.01)
*G06F 16/901* (2019.01)
(Continued)

(52) U.S. Cl.
CPC ........ *G06F 16/904* (2019.01); *G06F 16/9014* (2019.01); *G06F 16/9024* (2019.01); *G06F 16/90328* (2019.01)

(58) Field of Classification Search
None
See application file for complete search history.

(56) References Cited

U.S. PATENT DOCUMENTS 8,510,304 B1 8/2013 Briggs
10,846,284 B1 * 11/2020 Park ................. G06F 16/283
(Continued)

FOREIGN PATENT DOCUMENTS

EP 3258393 12/2017

OTHER PUBLICATIONS

European Patent Office, "Search Report" in application No. 16194936.7-1871, dated Mar. 9, 2017, 8 pages.
(Continued)

*Primary Examiner* — Tuankhanh D Phan
(74) *Attorney, Agent, or Firm* — Duane Morris LLP

(57) ABSTRACT

Techniques for visualizing dependencies in a data analytics system are described. In an embodiment, a visualization system may receive datasets and dataset dependency information for the datasets. The visualization system may receive a first type of analysis objects from a first analysis object system and dataset dependency information from an analysis object dependency service. The visualization system may receive a second type of analysis objects from a second analysis object system. The second type of analysis object may include a JSON representation of a set of operations that are applied during analysis such as a set of programming instructions. The visualization system may traverse and analyze the JSON representation to determine, for a given analysis object, one or more parent dependencies. The visualization system can then generate a graph of the datasets and analysis objects.

20 Claims, 7 Drawing Sheets

Related U.S. Application Data

(60) Provisional application No. 62/528,376, filed on Jul. 3, 2017.

(51) Int. Cl.
    *G06F 16/9032*    (2019.01)
    *G06F 16/904*     (2019.01)

(56) References Cited

U.S. PATENT DOCUMENTS

| | | |
|---|---|---|
| 2006/0129418 A1* | 6/2006 | Lee ............... G06Q 10/06 704/9 |
| 2012/0102006 A1 | 4/2012 | Larson |
| 2013/0246560 A1 | 9/2013 | Feng |
| 2013/0262403 A1 | 10/2013 | Milousheff |
| 2014/0324929 A1 | 10/2014 | Mason |
| 2015/0112998 A1 | 4/2015 | Shankar |
| 2016/0125000 A1 | 5/2016 | Meacham |
| 2016/0179828 A1 | 6/2016 | Ellis |
| 2016/0274558 A1* | 9/2016 | Strohmenger ......... G05B 15/02 |
| 2017/0357648 A1 | 12/2017 | Fink |

OTHER PUBLICATIONS

European Claims in application No. 16194936.7-1871, dated Mar. 3, 2017, 3 pages.

* cited by examiner

TECHNIQUES FOR VISUALIZING DEPENDENCIES IN A DATA ANALYTICS SYSTEM

CROSS-REFERENCE TO RELATED APPLICATIONS

This application claims the benefit as a continuation of U.S. patent application Ser. No. 15/782,647, filed Oct. 12, 2017 and issued Jul. 27, 2021 as U.S. Pat. No. 11,074,300; which claims the benefit of U.S. Provisional Patent App. No. 62/528,376, filed Jul. 3, 2017, the entire contents of each of which is hereby incorporated by reference as if fully set forth herein.

This application is related to U.S. patent application Ser. No. 15/262,207, filed Sep. 12, 2016 and issued Jun. 26, 2018 as U.S. Pat. No. 10,007,674, the entire contents of each of which is hereby incorporated by reference as if fully set forth herein.

TECHNICAL FIELD

The present disclosure relates to data analytics systems. More specifically, the disclosure relates to visualizing dependency information in a data analytics system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A data analytics system is a complex system that includes a plurality of datasets and a plurality of analysis objects. A dataset is a representation of a set of files and metadata regarding the set of files. A dataset may be dependent on one or more parent datasets. An analysis object is a representation of one or more operations for analyzing and/or visualizing data in one or more datasets. For example, an analysis object may include a set of python code to analyze one or more datasets, a JSON representation of operations to apply to one or more datasets, or HTML code for generating a document based on one or more datasets. An analysis object, therefore, may be dependent on one or more parent datasets. Given the complexity of dependencies between datasets and analysis objects, a change to a dataset may affect one or more downstream datasets or analysis objects that depend, either directly or indirectly, on the changed dataset. Thus, what is needed is way to visualize dependency information regarding dependencies in the data analytics system to assist users in identifying when a change to a dataset may affect a downstream dataset or analysis object.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

Figure 1:
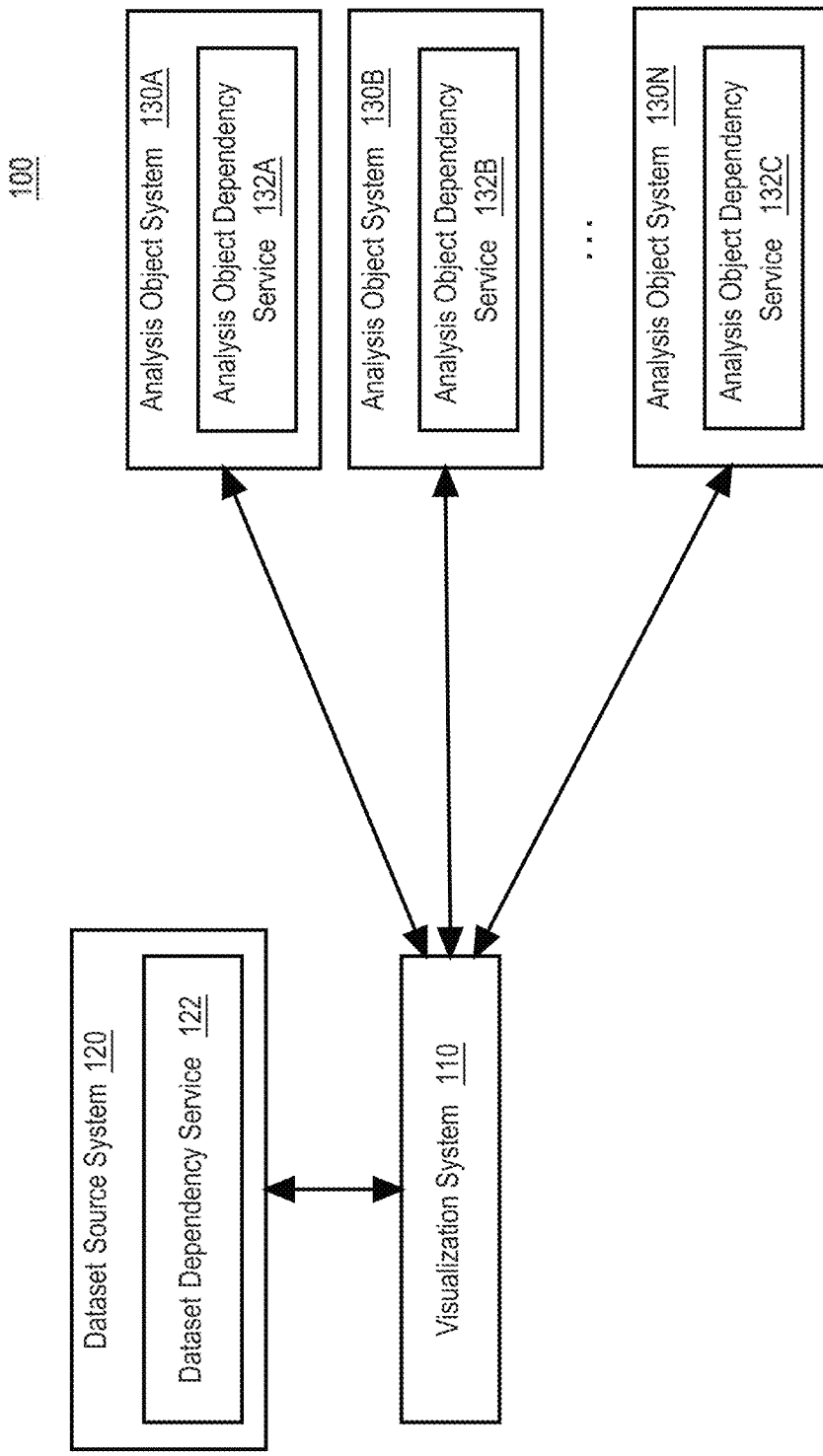
FIG. 1 is an example of a data analytics system, according to one embodiment.

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1.0 GENERAL OVERVIEW
2.0 EXAMPLE COMPUTER SYSTEM IMPLEMENTATION
   2.1 DATASETS
      2.1.1 DATASET SOURCE SYSTEM
   2.2 ANALYSIS OBJECTS
      2.2.1 ANALYSIS OBJECT SYSTEM
   2.3 VISUALIZATION SYSTEM
3.0 EXAMPLE PROCESSES AND ALGORITHMS
4.0 IMPLEMENTATION MECHANISMS—HARDWARE OVERVIEW
5.0 IMPLEMENTATION MECHANISMS—SOFTWARE OVERVIEW
6.0 OTHER ASPECTS OF DISCLOSURE

1.0 General Overview

Techniques for visualizing dependencies in a data analytics system are described. In an embodiment, a visualization system may receive datasets from a dataset source system. The visualization system may additionally request, for each dataset, dataset dependency information from a dataset dependency service. The dataset dependency service may provide a response that identifies, for a given dataset, one or more parent dataset dependencies.

In an embodiment, the visualization system may receive a first type of analysis objects from a first analysis object system. The visualization system may request, for each analysis object of the first type, dataset dependency information from an analysis object dependency service. The analysis object dependency service may provide a response that identifies, for a given analysis object, one or more parent dataset dependencies.

In an embodiment, the visualization system may receive a second type of analysis objects from a second analysis object system. The second type of analysis object may include a JSON representation of a set of operations that are applied during analysis. The visualization system may traverse and analyze the JSON representation to determine, for a given analysis object, one or more parent dataset dependencies.

The visualization system can then generate a graphical user interface (GUI) featuring a graph of the datasets and analysis objects. In an embodiment, the GUI may include user interface elements for manipulating the analysis objects with their native analysis object systems. In another embodiment, the GUI may include user interface elements for filtering, sorting, or reorganizing the graph based on source for the datasets and/or analysis objects.

The present disclosure provides improved techniques for visualizing dependencies between datasets and analysis objects. This may be helpful in assisting in identification of downstream datasets and/or analysis objects that have been updated in response to a change or update to an upstream dataset. This can be helpful for users in complex data analytics systems that want to be able to quickly and efficiently identify how analysis objects have been affected by a change to dataset.

2.0 Example Computer System Implementation

FIG. 1 illustrates an example of a data analytics system 100 in which the techniques described herein may be practiced, according to some embodiments. In the example of FIG. 1, data analytics system 100 is programmed or configured to use analysis objects, datasets, and dataset dependency information to generate a graph that depicts the dependency relationships between the analysis objects and datasets. Data analytics system 100 may be implemented across one or more physical or virtual computing devices, none of which is intended as a generic computer, since it is loaded with instructions in a new ordered combination as otherwise disclosed herein to implement the functions and algorithms of this disclosure. The example components of data analytics system 100 shown in FIG. 1 are implemented at least partially by hardware at one or more computing devices, such as one or more hardware processors executing stored program instructions stored in one or more memories for performing the functions that are described herein. Or, one or more virtual machine instances in a shared computing facility such as a cloud computing center may be used. The functions described herein are intended to indicate operations that are performed using programming in a special-purpose computer or general-purpose computer, in various embodiments. Data analytics system 100 illustrates only one of many possible arrangements of components configured to execute the programming described herein. Other arrangements may include fewer or different components, and the division of work between the components may vary depending on the arrangement.

Data analytics system 100 may include a dataset source system 120 that is communicatively coupled to visualization system 110. Dataset source system 120 is programmed or configured to generate and/or provide datasets to visualization system 110. A dataset is a representation of a set of files and metadata regarding the set of files. A dataset may be dependent on one or more parent datasets. In an embodiment, a dataset may allow for branching and/or version control for the set of files.

In an embodiment, dataset source system 120 may include dataset dependency service 122 that is programmed or configured to provide dataset dependency information for a given dataset. For example, visualization system 110 may request dataset dependency information for one or more datasets from dataset dependency service 122. The dataset dependency service 122 may provide a response to the visualization system 110 that identifies, for a given one or more datasets, one or more parent dataset dependencies. In one embodiment, dataset dependency service 122 may be implemented separately from the dataset source system 120. Further details regarding the dataset source system 100 will be discussed herein.

Data analytics system 100 may include one or more analysis object systems 130A through 130N that are communicatively coupled to visualization system 110. An analysis object system is programmed or configured to generate and/or provide analysis objects to visualization system 110. An analysis object is a representation of one or more operations for analyzing and/or visualizing data in one or more datasets. An analysis object may be dependent on one or more parent datasets. In an embodiment, each of analysis object systems 130A through 130N may generate and/or provide a different type of analysis object. For example, one analysis object system may be used to generate report analysis objects, whereas another analysis object system may be used to generate graphic-based analysis objects.

In an embodiment, one or more of analysis object systems 130A through 130N may optionally include an analysis object dependency service 132A through 132N that is programmed or configured to provide dataset dependency information for analysis objects that describes how analysis objects are related to parent datasets. In an embodiment, an analysis object dependency service 132 may be implemented separately from its respective analysis object system 130. Further details regarding analysis object systems 130A through 130N will be discussed herein.

Data analytics system 100 may include visualization system 110 that is programmed or configured to receive dataset dependency information from a dataset source system 120 and one or more analysis object systems 130A through 130N, and generate a graph display of the interdependencies between datasets and analysis objects. Further details regarding visualization system 110 will be discussed herein.

2.1 Datasets

A dataset is a representation of a set of files and metadata regarding the set of files. In an embodiment, the internal contents of a dataset may be version controlled. A child dataset may be dependent on one or more parent datasets, wherein the content of the child dataset is generated, computed, and/or determined based on the parent datasets. A dataset can be modified or updated in various ways, including, but not limited to: addition of a file to the dataset, updating of a file in the dataset, deletion of a file in the dataset, versioning of a file in the dataset, and/or modification of metadata in the dataset. When a parent dataset is updated, the contents of downstream child datasets that depend on the parent dataset, either directly or indirectly, are updated as well.

Figure 2:
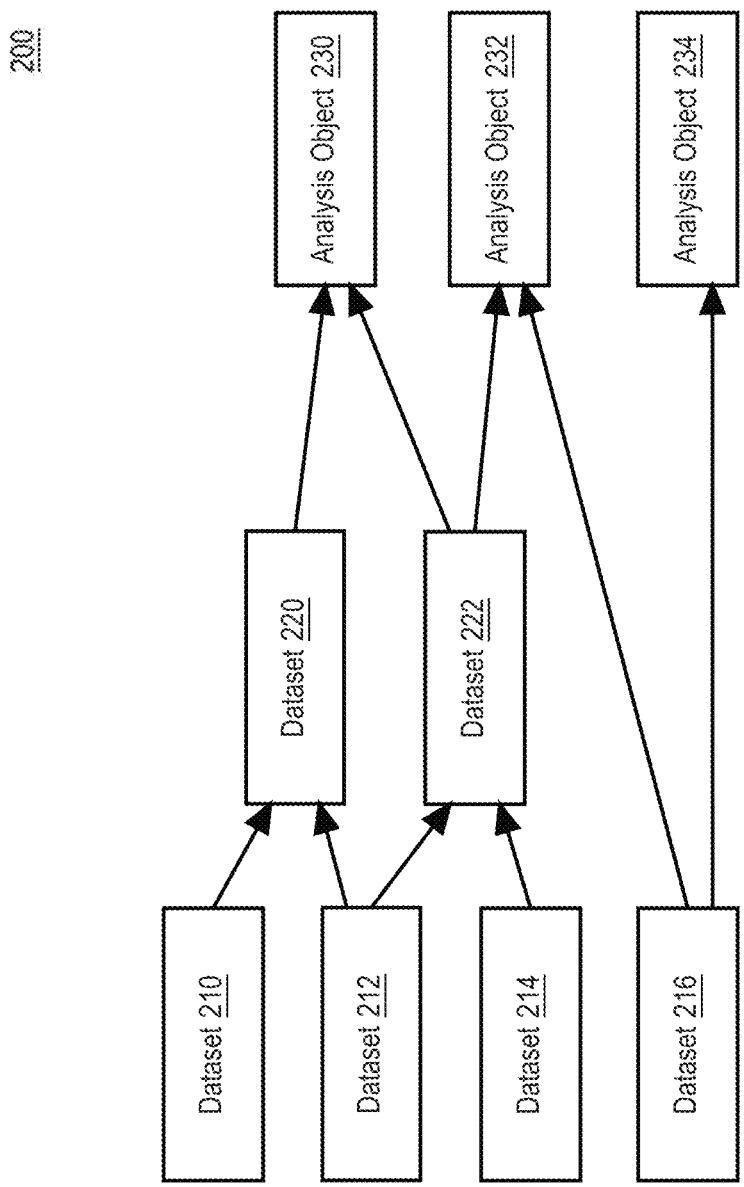
FIG. 2 is an example of a dataset hierarchy, according to one embodiment.

To illustrate, FIG. 2 illustrates an example dataset hierarchy 200 that shows one particular embodiment of the relationships between various datasets. The example of FIG. 2 is merely an example used to illustrate these dataset concepts. Example dataset hierarchy 200 includes datasets 210, 212, 214, 216, 220, and 222. In this example dataset hierarchy 200, datasets 210, 212, 214, and 216 can be described as raw datasets. A raw dataset is one that does not depend on any parent datasets. Thus, a raw dataset may represent a source of input to the example dataset hierarchy 200, such as the contents of a database table, a comma separated value (.CSV) file, file server, or some other digital data source.

In this example dataset hierarchy 200, datasets 220 and 222 can be described as intermediate datasets. An intermediate dataset is a dataset that depends on one more parent datasets. Specifically, in this example, dataset 220 depends on datasets 210 and 212, and dataset 222 depends on datasets 212 and 214. Dataset 220 can be called a child dataset of parent datasets 210 and 212. Likewise, dataset 222 can be called a child dataset of parent datasets 212 and 214. An update to a parent dataset causes downstream child datasets to be updated. For example, if dataset 210 is updated, then dataset 220 would also need to be updated, since dataset 220 depends on dataset 210. Similarly, if dataset 212 is updated, both datasets 220 and 222 would also need to be updated, since both datasets 220 and 222 depend on dataset 212. Further information about datasets can be found in related application U.S. patent application Ser. No. 15/262,207, filed Sep. 12, 2016, the entire contents of which is hereby incorporated by reference as if fully set forth herein.

Although the example dataset hierarchy 200 illustrates two levels of datasets, in other embodiments, there may be many more levels to the hierarchy. For example, a first intermediate dataset may act as a parent dataset to a second intermediate dataset. Thus, the second intermediate dataset depends on the first intermediate dataset.

2.1.1. Dataset Source System

Dataset source system 120 is programmed or configured to generate, update, and/or provide datasets to visualization system 110. In an embodiment, dataset source system 120 uses transformation logic to generate or update raw datasets based on the source input, such as a database, a file server, a file, or some other source of digital data. For example, a raw dataset may be generated based on a .CSV file by parsing the .CSV file, filtering certain contents of the .CSV file, applying transformation logic to the contents of the .CSV file, and using the updated contents of the .CSV file to create a raw dataset.

In an embodiment, dataset source system 120 uses transformation logic to generate or update intermediate datasets based on one or more parent datasets. In an embodiment, dataset source system 120 uses transformation logic to take the contents of one or more parent datasets and generate a new intermediate dataset based on the parent datasets.

Dataset dependency service 122 stores information that describes the dataset dependencies for a set of datasets. In an embodiment, dataset dependency service 122 is implemented as a part of dataset source system 120, however, in another embodiment, dataset dependency service 122 is implemented separately. Dataset dependency service 122 is programmed or configured to receive requests for dataset dependency information for a given dataset or set of datasets. In response to such a request, dataset dependency service 122 may provide a response that identifies, for every dataset, any parent dataset dependencies that exist.

For example, with reference to the example dataset hierarchy 200, dataset dependency information may include a hash map comprising a plurality of entries, wherein each entry maps a first dataset identifier to a second dataset identifier. Each entry in the hash map thus represents a dependency relationship. For example, an entry may indicate the key-value pair (220, 210) to indicate that dataset 210 is a parent dataset of dataset 220. A second key-value pair (220, 212) may indicate that dataset 212 is a parent dataset of dataset 220. In this example, the keys in the hash map are the child datasets, and the values in the hash map are the parent datasets, however, these may be reversed in other implementations. In fact, dataset dependency information may be stored in any format of data structure, and is not necessarily limited to a hash map.

2.2 Analysis Objects

An analysis object is a representation of one or more operations for analyzing, inspecting, visualizing, manipulating, or interacting with the contents of one or more datasets. For example, analysis objects may be used to graph the contents of one or more datasets, generate reports based on the one or more datasets, or any other similar interaction with the datasets. An analysis object is therefore dependent on one or more datasets.

In an embodiment, an analysis object may include a set of operations for analyzing or visualizing one or more datasets. In an embodiment, the operations may include programming instructions and may be implemented in any programming language, such as PYTHON, MATLAB, R, C, C++, OBJECTIVE-C, JAVA, SQL, or the like. The operations may be used to analyze, inspect, visualize, and/or manipulate the contents of one or more datasets. In an embodiment, an analysis object may be a computational notebook. A computational notebook may comprise notebook metadata that specifies a kernel for execution, and/or one or more computational cells, wherein each cell comprises cell metadata, a source code reference to a segment of source code, and/or an output reference to a set of output data.

In an embodiment, an analysis object may contain a string that is used to annotate or to comment on the analysis of the underlying data in the one or more datasets. For example, a string may be used to tag a function in an analysis object as a "linear regression method" or to comment on a trend observed in the one or more datasets. In an embodiment, the string may be stored in a markdown syntax.

In an embodiment, an analysis object may include a set of operations for visualizing the contents of one or more datasets. For example, in an embodiment, an analysis object may include a JavaScript Object Notation (JSON) representation of a set of operations performed on or with the one or more datasets. In an embodiment, the set of operations may include one or more of: state information of the one or more datasets, annotations on underlying data in the one or more datasets, comments on visualizations of the underlying data in the one or more datasets, interval selection of the underlying data in the one or more datasets, and/or a set of programming instructions applied to the one or more datasets. In an embodiment, the set of programming instructions may include a sequence of user interface instructions for viewing one or more datasets in a dataset content viewer. The user interface instructions may include instructions for filtering the content of the dataset, graphing the content of the dataset, charting the content of the dataset, or any other visual manipulation of the content of the dataset.

In an embodiment, an analysis object may include a set of programming instructions for using Hypertext Markup Language (HTML) code and/or Cascading Style Sheets (CSS) to generate a document based on one or more datasets. For example, HTML and CSS may be used generate a document, report or web page based on the contents of the dataset.

Given that an analysis object includes a set of operations for analyzing, inspecting, visualizing, manipulating, or interacting with the contents of one or more datasets, an analysis object is dependent on one or more datasets. An analysis object is dependent on one or more parent datasets, wherein the contents or output of the analysis object is generated, computed, and/or determined based on the parent datasets.

The example dataset hierarchy 200 of FIG. 2 shows analysis objects 230, 232, and 234. Specifically, in this example, analysis object 230 directly depends on datasets 220 and 222, and analysis object 232 directly depends on datasets 222, and 216, and analysis object 234 directly depends on dataset 216. Moreover, analysis object 230 indirectly depends on raw datasets 210, 212, and 214, as the intermediate datasets 220 and 222 depend on raw datasets 210, 212, and 214.

An update to a dataset causes downstream analysis objects to be updated. For example, if dataset 210 is updated, then dataset 220 will also need to be updated, as will analysis object 230.

Given the complexity of how datasets depend on one another and how analysis objects depend on datasets, it can be difficult to assess, when a dataset is updated and/or which downstream analysis objects have been affected. Determining which downstream analysis objects have been affected by an update to a dataset is important because it allows users to quickly and efficiently find and view analysis objects that have been updated in response to an update that was applied to an upstream dataset. In a complex data analytics system with thousands of datasets and/or thousands of analysis objects, it can be difficult to identify these effects.

2.2.1 Analysis Object System

Analysis object system 130A through 130N are each programmed or configured to generate, update, and/or provide analysis objects to visualization system 110. In an embodiment, each analysis object system 130 uses transformation logic to generate or update analysis objects based on the one or more parent datasets of the analysis object.

In an embodiment, dataset dependency information may describe the dataset dependencies for an analysis object. In one embodiment, dataset dependency information for an analysis may be provided by an analysis object dependency service. In another embodiment, dataset dependency information for an analysis object may be determined and generated directly by inspecting an analysis object.

In an embodiment, one or more of analysis object systems 130A through 130N optionally includes a corresponding analysis object dependency service 132A through 132N. Each analysis object dependency service 132A through 132N can be implemented as a part of the respective analysis object system 130A through 130N. In another embodiment, each analysis object dependency service 132A through 132N is implemented separately from the corresponding analysis object system 130A through 130N. An analysis object dependency service 132 is programmed or configured to receive requests for dataset dependency information for a given analysis object or set of analysis objects. In response to such a request, analysis object dependency service 132 may provide a response that identifies, for a given analysis object, one or more parent dataset dependencies. In one embodiment, analysis object dependency service is programmed or configured to store dependency information for an analysis object at the time that the analysis object is generated.

As an example, with reference to the example dataset hierarchy 200, dataset dependency information may include a hash map comprising a plurality of entries, wherein each entry maps a first analysis object identifier to a second dataset identifier. Each entry in the hash map thus represents a dependency relationship between a child analysis object and a parent dataset. For example, an entry may indicate the key-value pair (230, 220) to indicate that dataset 220 is a parent dataset of analysis object 230. A second key-value pair (232, 222) may indicate that dataset 222 is a parent dataset of analysis object 232. In this example, the keys in the hash map are the child analysis objects, and the values in the hash map are the parent datasets, however, these may be reversed in other implementations. In fact, dataset dependency information may be stored in any format of data structure, and is not necessarily limited to a hash map.

In another embodiment, dependency information for an analysis object may be determined directly from the analysis object itself. For example, an analysis object may represent a sequence of operations for manipulating one or more parent datasets. In one embodiment, the sequence of operations many be represented as a JSON blob. Thus, analysis object inspection logic can be programmed or configured to parse and traverse the sequence of operations of an analysis object to identify what datasets are being manipulated by the analysis object. The datasets that are identified by the analysis object inspection logic can be identified as the parent dependent datasets of the analysis object and stored as dataset dependency information. In one embodiment, the analysis object inspection logic may be implemented as part of an analysis object dependency service 132, but in another embodiment, the analysis object inspection logic may be implemented in the visualization system 110.

For example, in one embodiment, each analysis object and dataset is mapped to a unique node, stored in a node store. Dependency information is used to generate links between nodes, where nodes are generated by traversing all children and linking parents. Links may be stored at both the node level, wherein each node may have a reference to their parents and children, and/or links may be stored as a top level cache with child nodes serving as keys and parent nodes serving as values. The analysis object inspection logic can be programmed or configured to traverse the node links to determine which linking parent nodes and linking child nodes exist for a given node.

In one embodiment, the various analysis object systems 130A through 130N may be implemented for different types of analysis objects and may use different techniques for providing dependency information to visualization system 110. For example, analysis object system 130A may use an analysis object dependency service 132A to store dependency information regarding its analysis objects and send that dependency information to visualization system 110 in response to a request, for example, over an application programming interface (API). On the other hand, analysis object system 130N may omit analysis object dependency service 132N and instead merely provide analysis objects to visualization system 110. Visualization system 110 may then be programmed or configured to include analysis object inspection logic to inspect the contents of analysis objects received from analysis object system 130N and generate dependency information directly based on parsing and traversing the analysis object. A mixed approach may be necessary for collecting dependency information across varied analysis object systems 130A through 130N.

2.3 Visualization System

Visualization system 110 is programmed or configured to use datasets, analysis objects, and dependency information to generate a graphical display. The graphical display allows a user to easily identify which downstream datasets and analysis objects have been updated based on a modification to an upstream dataset.

Figure 3:
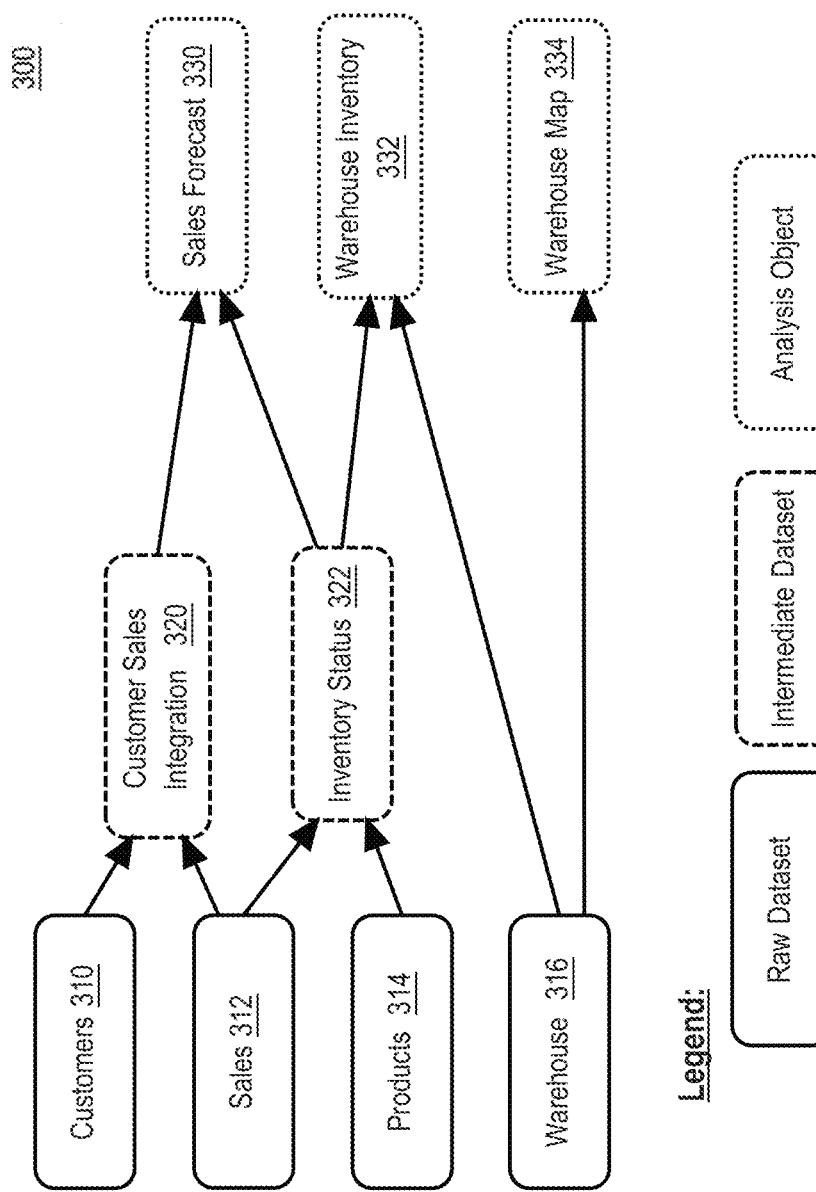
FIG. 3 is an example of a graphical display, according to one embodiment.

FIG. 3 illustrates an example graphical display 300 that can be depicted by visualization system 110 and that corresponds to the example dataset hierarchy 200 of FIG. 2. In graphical display 300, nodes 310, 312, 314, and 316 correspond to raw datasets 210, 212, 214, and 216. In this example, nodes 310, 312, 314, and 316 represent datasets generated based on tables in a database representing customers, sales, products, and warehouse data, respectively.

Nodes 320 and 322 correspond to intermediate datasets 220, and 222. In this example, nodes 320 and 322 represent datasets related to customer sales integration and inventory status, respectively. Customer sales integration node 320 depends on customers node 310 and sales node 312. Inventory status node depends on sales node 312 and products node 314.

Nodes 330, 332, and 334 correspond to analysis objects 230, 232, and 234 and represent analysis of their parent datasets. Analysis object 330 represents a sales forecast, such as a report that is computed based on customer sales integration node 320 and inventory status 322. Analysis object 332 represent a warehouse inventory, such as a webpage that is computed based on inventory status node 322 and warehouse node 316. Finally, analysis object 334 represents a warehouse map, such as a geographical map that depicts the locations of warehouses that depends on warehouse node 316.

Geographical display 300 may optionally include a legend that provides a visual key for the contents of the graph.

In an embodiment, visualization system 110 is programmed to display graphical display 300. Visualization system 110 is programmed or configured to receive dataset data corresponding to nodes 310, 312, 314, 316, 320, and 322 from dataset source system 120. Visualization system 110 is programmed or configured to receive analysis objects corresponding to nodes 330, 332, and 334 from one or more analysis object systems 130A through 130N. Visualization system 110 may then request and receive dependency information for datasets and analysis objects from dataset dependency service 122 and analysis object dependency services 132A through 132N. In some embodiments visualization system 110 may generate some dependency information for an analysis object using analysis object inspection logic to examine the contents of the analysis object directly rather than requesting the dependency information from an analysis object dependency service.

Once visualization system 110 has received the datasets, analysis objects, and dependency information, it is programmed or configured to display a graph, such as graphical display 300, depicting the dependencies between datasets and analysis objects as specified in the analysis object. In one embodiment, each dataset may be represented by a node and each analysis object may be represented by a node as well. The graph, may include a visual indication, such as a line, to depict a dependency between two datasets or between a dataset and analysis object. In one embodiment, all datasets and analysis objects are depicted in the graph, however, in another embodiment, only a subset of the nodes are displayed in the graph to improve system performance in complex systems with a significant amount of nodes or dependencies.

In one embodiment, the graph displayed by visualization system 110 may include visual characteristics to help a user understand the content. Visual characteristics may include background color, border color, border type, font size, font color, node shape, or any other similar visual manipulation of data in a graph. For example, in graphical display 300, raw datasets, intermediate datasets, and analysis objects have different border types to help a user understand the contents of the graph and differentiate between different types of nodes. In one embodiment, the visual characteristics of a node may be different based upon the number of parent datasets, the number of downstream datasets, the type of analysis object, or some other characteristic of the dataset or analysis object that the node represents.

In one embodiment, the graph displayed by visualization system 110 may provide a user with user interface options for manipulating, filtering, sorting, or reordering the contents of the graph. These options allow a user to customize what nodes they want to view.

The graph displayed by visualization system 110 thus provides a user with an easy visualization of the interdependencies between datasets and analysis objects. For example, if the raw dataset corresponding to sales node 312 is updated, graphical display 300 can be viewed by a user to easily determine that sales forecast 330 and warehouse inventory 332, which both indirectly depend on sales node 312, have also been updated. The user will then know to check the appropriate sales forecast 323 and warehouse 332 to see new content. In an embodiment, when a user interacts with a node that corresponds to an analysis object node, a user can access the underlying analysis object. For example, when a user clicks the sales forecast node 330 in graphical display 300, the corresponding sales forecast report that was generated by the underlying analysis object may be displayed. The sales forecast may be displayed or launched in visualization system 110, the corresponding analysis object system 130, or in some other third party application. In other embodiments, the user interactions may include any available computer-based user interactions, such as a button click, touch gesture, mouse gesture, click, menu dropdown, or the like.

3.0 Example Processes and Algorithms

Figure 4:
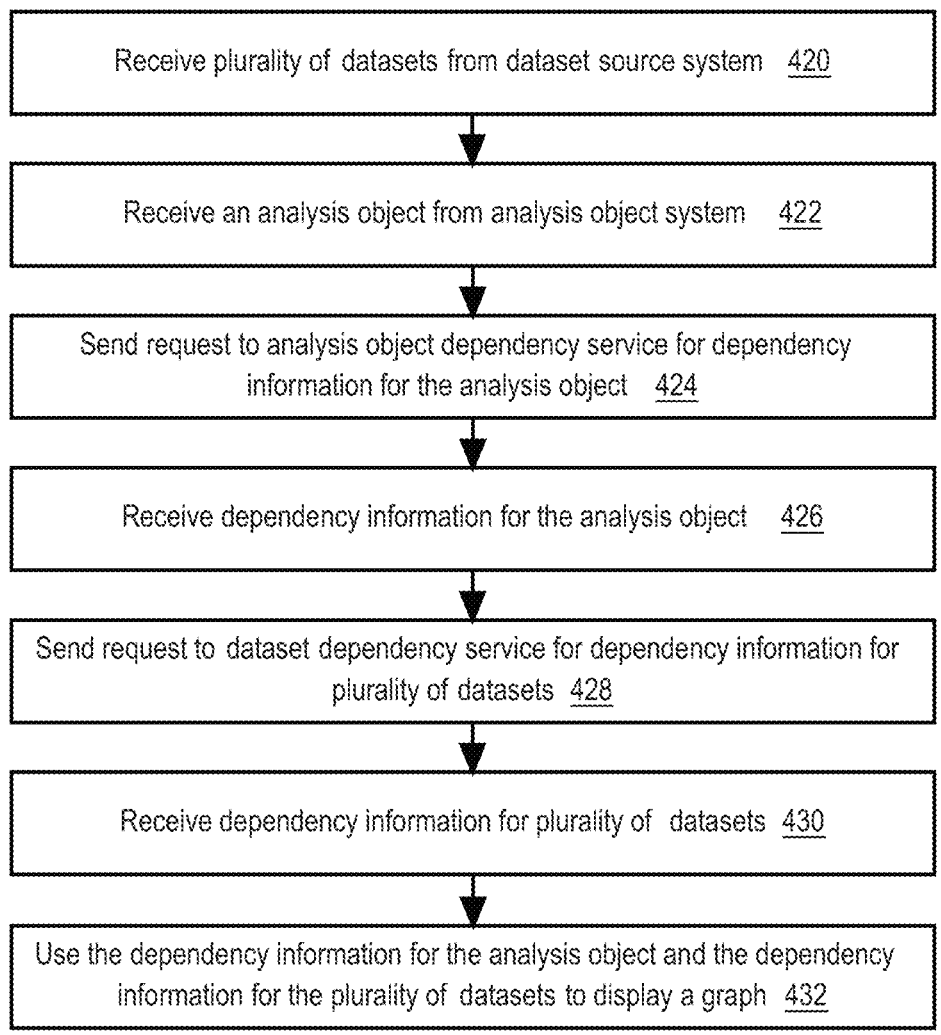
FIG. 4 is an example of flow diagram of a process for displaying a graph based on datasets, analysis objects, and dependency information

FIG. 4 illustrates a process 400 of displaying a graph based on datasets, analysis objects, and dependency information. For purposes of illustrating a clear example, FIG. 4 is described with reference to data analytics system 100, but other embodiments may implement or execute the process 400 using other computer systems. FIG. 4, and each other flow diagram in this disclosure, is intended to illustrate an algorithm that can be used as the basis of programming an implementation of one or more of the claims that are set forth herein, using digital computers and a programming language or development environment, and is illustrated and described at the level at which skilled persons, in the field to which this disclosure is directed, are accustomed to communicating with one another to identify or describe programs, methods, objects and the like that can provide a working system.

In step 420, visualization system 110 is programmed or configured to receive a plurality of datasets from dataset source system 120. In one embodiment, dataset source system 120 may individually send each dataset of the plurality of datasets to visualization system 110 as each dataset is generated or updated. In another embodiment, dataset source system 120 may send the plurality of datasets to visualization system 110 in response to a request from visualization system 110. The process 400 may then proceed to step 422.

In step 422, visualization system 110 is programmed or configured to receive an analysis object from an analysis object system 130. In one embodiment, analysis object system 130 may send the analysis object to visualization system 110 as the analysis object is generated or updated. In another embodiment, analysis object system 130 may send the analysis object to visualization system 110 in response to a request from visualization system 110. The process 400 may then proceed to step 424.

In step 424, visualization system 110 is programmed or configured to send a request to analysis object dependency service 132 for dataset dependency information for the analysis object. For example, the request may be sent over an API, an HTTP request, or some other communications interface. The process 400 may then proceed to step 426.

In step 426, visualization system 110 is programmed or configured to receive dataset dependency information for the analysis object from analysis object dependency service 132. The dependency information identifies one or more direct parent datasets for the analysis object. In an embodiment, the dependency information may be represented as a hash map of entries, wherein each entry is a key value pair between an identifier for the analysis object and an identifier for the parent dataset. The process 400 may then proceed to step 428.

In step 428, visualization system 110 is programmed or configured to send a request to dataset dependency service 122 for dataset dependency information for the plurality of datasets. For example, the request may be sent over an API, an HTTP request, or some other communications interface. The process 400 may then proceed to step 430.

In step 430, visualization system 110 is programmed or configured to receive dataset dependency information for the plurality of datasets from the dataset dependency service 122. The dependency information identifies for each particular dataset of the plurality datasets what datasets, if any, are the parent datasets of the particular dataset. In an embodiment, the dependency information may be represented as a hash map of entries, wherein each entry is a key value pair between an identifier for the particular dataset and an identifier for the parent dataset of the particular dataset. The process 400 may then proceed to step 432.

In step 432, visualization system 110 is programmed or configured to use the plurality of datasets, the analysis object, the dependency information for the analysis object, and the dependency information for the plurality of datasets to display a graph. In an embodiment, each dataset of the plurality of datasets and each analysis object may be depicted as a node in the graph. Each dependency in the dependency information may be represented by a line connecting the nodes for the corresponding datasets and/or analysis objects. In an embodiment, the nodes of the graph may be filtered, sorted, or reorganized via a user interface, to allow a user to better manipulate and view the content of the graph. The process 400 may then end. The process 400 may be similarly implemented for a plurality of analysis objects.

Figure 5:
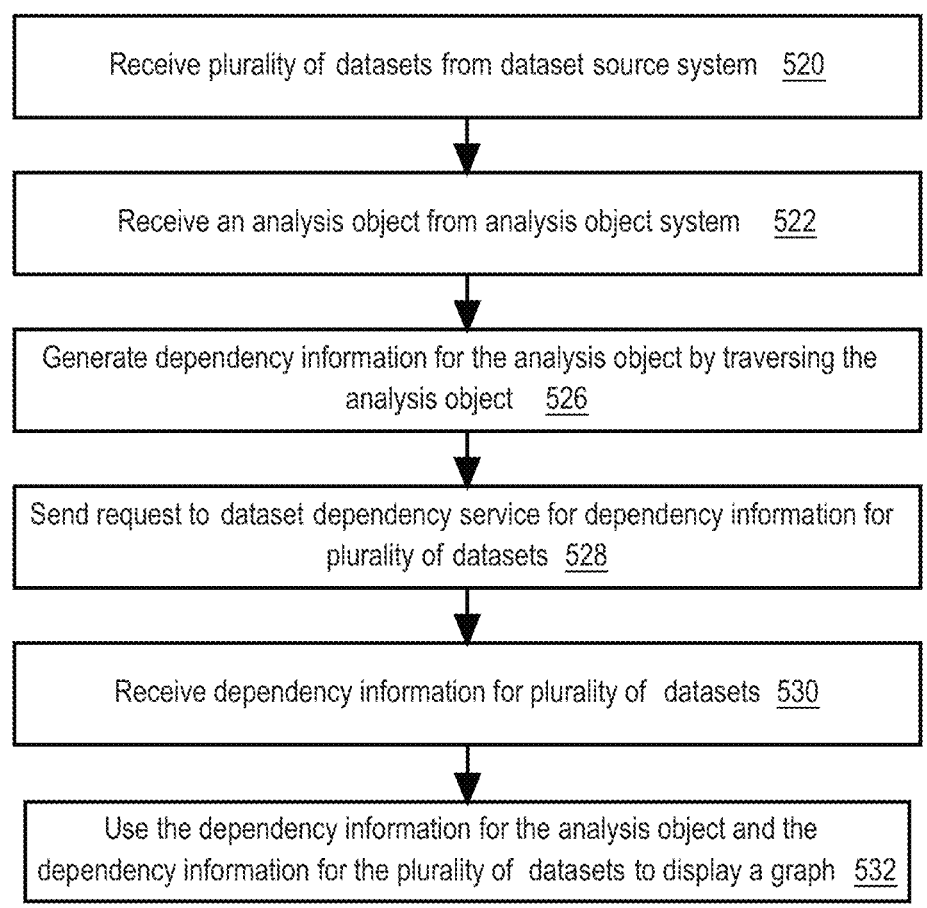
FIG. 5 is an example of flow diagram of a process for displaying a graph based on datasets, analysis objects, and dependency information

FIG. 5 illustrates a process 500 of displaying a graph based on datasets, analysis objects, and dependency information. For purposes of illustrating a clear example, FIG. 5 is described with reference to data analytics system 100, but other embodiments may implement or execute the process 500 using other computer systems.

In step 520, visualization system 110 is programmed or configured to receive a plurality of datasets from dataset source system 120. In one embodiment, dataset source system 120 may send each dataset of the plurality of datasets to visualization system 110 as each dataset is generated or updated. In another embodiment, dataset source system 120 may send the plurality of datasets to visualization system 110 in response to a request from visualization system 110. The process 500 may then proceed to step 522.

In step 522, visualization system 110 is programmed or configured to receive an analysis object from an analysis object system 130. In one embodiment, analysis object system 130 may send the analysis object to visualization system 110 as the analysis object is generated or updated. In another embodiment, analysis object system 130 may send the analysis object to visualization system 110 in response to a request from visualization system 110. The process 500 may then proceed to step 526.

In step 526, visualization system 110 is programmed or configured to generate dependency information for the analysis object. For example, analysis object may comprise a sequence of operations for interacting with one or more parent datasets. Visualization system 110 may be programmed or configured to use analysis object inspection logic to parse and traverse the sequence of operations and identifier the one or more parent datasets in the sequence of operations. The dependency information identifies one or more direct parent datasets for the analysis object. In an embodiment, the dependency information may be represented as a hash map of entries, wherein each entry is a key value pair between an identifier for the analysis object and an identifier for the parent dataset. The dependency information may be stored. The process 500 may then proceed to step 528.

In step 528, visualization system 110 is programmed or configured to send a request to dataset dependency service 122 for dataset dependency information for the plurality of datasets. For example, the request may be sent over an API, an HTTP request, or some other communications interface. The process 500 may then proceed to step 530.

In step 530, visualization system 110 is programmed or configured to receive dataset dependency information for the plurality of datasets from the dataset dependency service 122. The dependency information identifies for each particular dataset of the plurality datasets what datasets, if any, are the parent datasets of the particular dataset. In an embodiment, the dependency information may be represented as a hash map of entries, wherein each entry is a key value pair between an identifier for the particular dataset and an identifier for the parent dataset of the particular dataset. The process 500 may then proceed to step 532.

In step 532, visualization system 110 is programmed or configured to use the plurality of datasets, the analysis object, the dependency information for the analysis object, and the dependency information for the plurality of datasets to display a graph. In an embodiment, each dataset of the plurality of datasets and each analysis object may be depicted as a node in the graph. Each dependency in the dependency information may be represented by a line connecting the nodes for the corresponding datasets and/or analysis objects. In an embodiment, the nodes of the graph may be filtered, sorted, or reorganized via a user interface, to allow a user to better manipulate and view the content of the graph. The process 500 may then end. The process 500 may be similarly implemented for a plurality of analysis objects.

Although described as two separate processes 400 and 500, in one embodiment, the processes 400 and 500 may be combined. For example, a data analytics system 100 may include a plurality of analysis object systems 130A through 130N. Process 400 may be used for one analysis object system 130A, and process 500 may be used for a second analysis object system 130N, for example if no analysis object service 132N is available for analysis object system 130N.

4.0 Implementation Mechanisms—Hardware Overview

Figure 6:
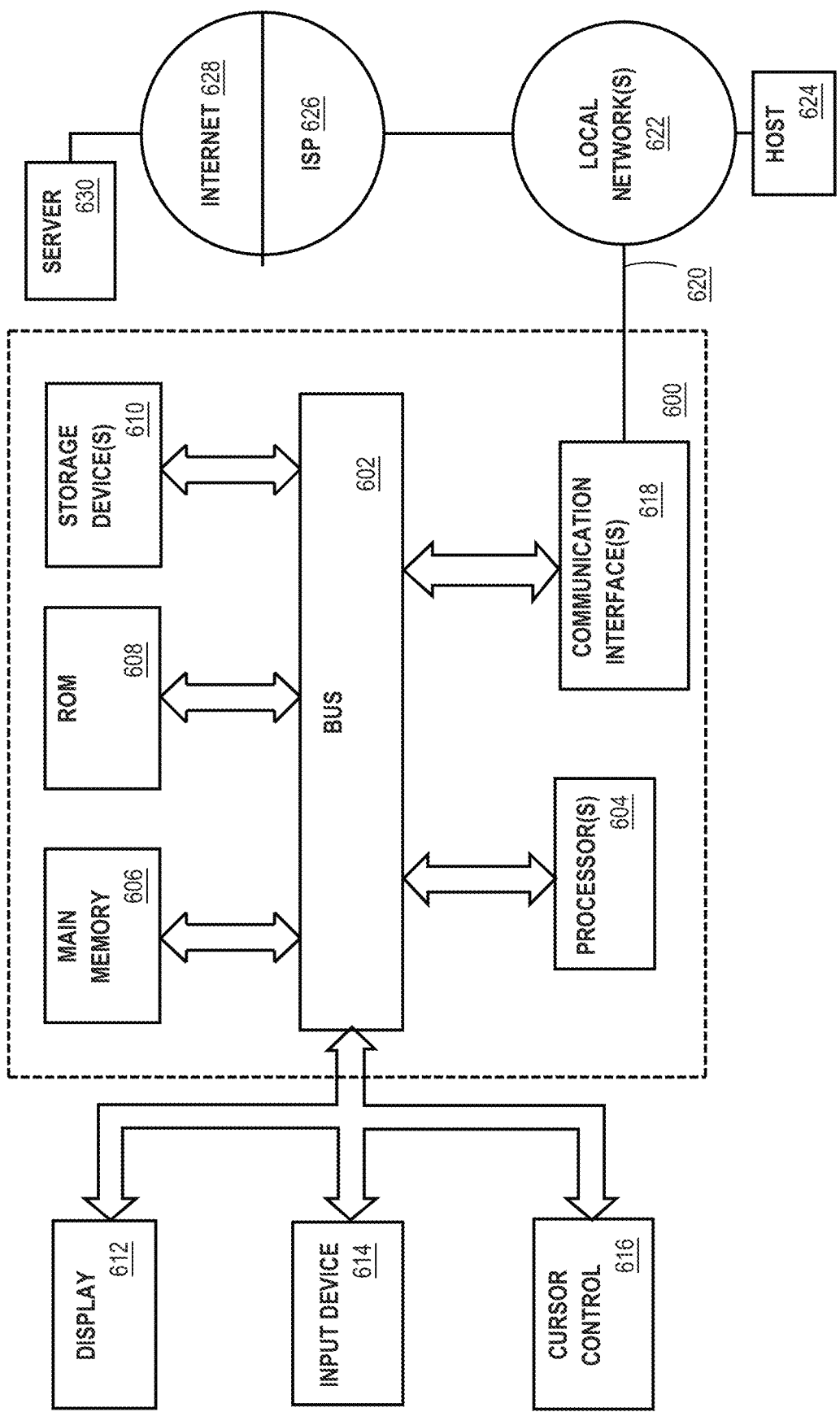
FIG. 6 is a block diagram of a computing device in which the example embodiment(s) of the present invention may be embodied.

Referring now to FIG. 6, it is a block diagram that illustrates a computing device 600 in which the example embodiment(s) of the present invention may be embodied. Computing device 600 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 600 may include a bus 602 or other communication mechanism for addressing main memory 606 and for transferring data between and among the various components of device 600.

Computing device 600 may also include one or more hardware processors 604 coupled with bus 602 for processing information. A hardware processor 604 may be a general purpose microprocessor, a system on a chip (SoC), or other processor.

Main memory 606, such as a random access memory (RAM) or other dynamic storage device, also may be coupled to bus 602 for storing information and software instructions to be executed by processor(s) 604. Main memory 606 also may be used for storing temporary variables or other intermediate information during execution of software instructions to be executed by processor(s) 604.

Software instructions, when stored in storage media accessible to processor(s) 604, render computing device 600 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 600 also may include read only memory (ROM) 608 or other static storage device coupled to bus 602 for storing static information and software instructions for processor(s) 604.

One or more mass storage devices 610 may be coupled to bus 602 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 610 (e.g., the main hard disk for the device) stores a body of program and data for directing operation of the computing device, including an operating system, user application programs, driver and other support files, as well as other data files of all sorts.

Computing device 600 may be coupled via bus 602 to display 612, such as a liquid crystal display (LCD) or other electronic visual display, for displaying information to a computer user. In some configurations, a touch sensitive surface incorporating touch detection technology (e.g., resistive, capacitive, etc.) may be overlaid on display 612 to form a touch sensitive display for communicating touch gesture (e.g., finger or stylus) input to processor(s) 604.

An input device 614, including alphanumeric and other keys, may be coupled to bus 602 for communicating information and command selections to processor 604. In addition to or instead of alphanumeric and other keys, input device 614 may include one or more physical buttons or switches such as, for example, a power (on/off) button, a "home" button, volume control buttons, or the like.

Another type of user input device may be a cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

While in some configurations, such as the configuration depicted in FIG. 6, one or more of display 612, input device 614, and cursor control 616 are external components (i.e., peripheral devices) of computing device 600, some or all of display 612, input device 614, and cursor control 616 are integrated as part of the form factor of computing device 600 in other configurations.

Functions of the disclosed systems, methods, and modules may be performed by computing device 600 in response to processor(s) 604 executing one or more programs of software instructions contained in main memory 606. Such software instructions may be read into main memory 606 from another storage medium, such as storage device(s) 610. Execution of the software instructions contained in main memory 606 cause processor(s) 604 to perform the functions of the example embodiment(s).

While functions and operations of the example embodiment(s) may be implemented entirely with software instructions, hard-wired or programmable circuitry of computing device 600 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more software instructions to processor(s) 604 for execution. For example, the software instructions may initially be carried on a magnetic disk or solid-state drive of a remote computer. The remote computer can load the software instructions into its dynamic memory and send the software instructions over a telephone line using a modem. A modem local to computing device 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor(s) 604 retrieves and executes the software instructions. The software instructions received by main memory 606 may optionally be stored on storage device(s) 610 either before or after execution by processor(s) 604.

Computing device 600 also may include one or more communication interface(s) 618 coupled to bus 602. A communication interface 618 provides a two-way data communication coupling to a wired or wireless network link 620 that is connected to a local network 622 (e.g., Ethernet network, Wireless Local Area Network, cellular phone network, Bluetooth wireless network, or the like). Communication interface 618 sends and receives electrical, electromagnetic, or optical signals that carry digital data streams representing various types of information. For example, communication interface 618 may be a wired network interface card, a wireless network interface card with an integrated radio antenna, or a modem (e.g., ISDN, DSL, or cable modem).

Network link(s) 620 typically provide data communication through one or more networks to other data devices. For example, a network link 620 may provide a connection through a local network 622 to a host computer 624 or to data equipment operated by an Internet Service Provider (ISP) 626. ISP 626 in turn provides data communication services through the world wide packet data communication network now commonly referred to as the "Internet" 628. Local network(s) 622 and Internet 628 use electrical, electromagnetic or optical signals that carry digital data streams. The signals through the various networks and the signals on network link(s) 620 and through communication interface(s) 618, which carry the digital data to and from computing device 600, are example forms of transmission media.

Computing device 600 can send messages and receive data, including program code, through the network(s), network link(s) 620 and communication interface(s) 618. In the Internet example, a server 630 might transmit a requested code for an application program through Internet 628, ISP 626, local network(s) 622 and communication interface(s) 618.

The received code may be executed by processor 604 as it is received, and/or stored in storage device 610, or other non-volatile storage for later execution.

5.0 Implementation Mechanisms—Software Overview

Figure 7:
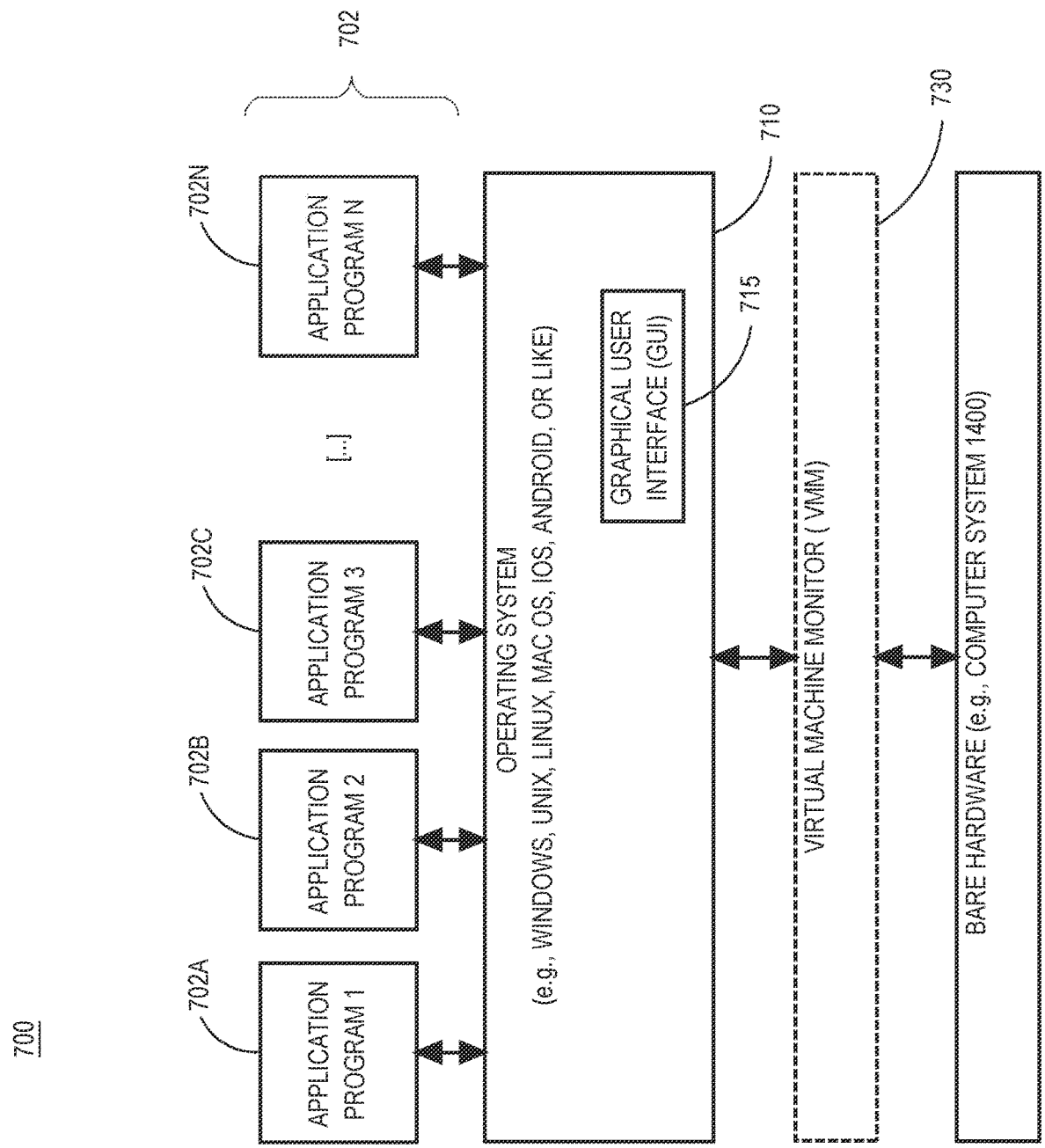
FIG. 7 is a block diagram of a software system for controlling the operation of the computing device.

FIG. 7 is a block diagram of a software system 700 that may be employed for controlling the operation of computing device 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing device 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on device 700 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of device 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the device 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of device 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

The above-described computer hardware and software is presented for purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

6.0 Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method comprising:
    parsing operations of a first analysis object for visualizing data to identify datasets to be visualized via the operations;
    determining, based on the parsing, first dataset dependency information for the first analysis object,
    the first dataset dependency information identifying a first set of one or more datasets to which the operations apply and on which the first analysis object depends, each dataset of the first set of one or more datasets contained in one or more data files stored in a storage media,
    using the first dataset dependency information to cause a visual graph to be presented in a computer graphical user interface,
    the visual graph comprising one or more nodes representing the first set of one or more datasets and a node representing the first analysis object and one or more edges between the one or more nodes representing the first set of one or more datasets and the node representing the first analysis object, each edge of the one or more edges representing a data dependency of the first analysis object on a respective dataset of the first set of one or more datasets,
    wherein the method is performed using one or more processors.

2. The method of claim 1, wherein the parsed operations of the first analysis object comprise PYTHON programming language instructions for analyzing the first set of one or more datasets, a JavaScript Object Notation (JSON) representation of operations to apply to the first set of one or more datasets, or HyperTextMarkupLanguage (HTML) code for generating a document based on the first set of one or more datasets.

3. The method of claim 1, wherein the node of the presented visual graph representing the first analysis object has a distinct visual appearance in the computer graphical user interface from the one or more nodes of the presented visual graph representing the first set of one or more datasets so as to visually indicate that the node representing the first analysis object represents an analysis object and not a dataset.

4. The method of claim 1, wherein the parsed operations of the first analysis object comprise programming language instructions for analyzing the first set of one or more datasets selected from the group consisting of MATLAB, R, C, C++, OBJECTIVE-C, JAVA, or SQL programming language instructions.

5. The method of claim 1, the operations including comments on visualizations of underlying data in the one or more datasets or interval selection of the underlying data in the one or more datasets.

6. The method of claim 5, wherein the processing the operations of the first analysis object to cause a visualization of the first set of one or more datasets to be presented in the computer graphical user interface is performed in response to detecting a user input directed to the node of the presented visual graph representing the first analysis object.

7. The method of claim 1, further comprising:
    determining second dataset dependency information for the first set of one or more datasets, the second dataset dependency information identifying a second dataset on which the first set of one or more datasets depend, the second dataset contained in one or more data files stored in a storage media; and
    using the second dataset dependency information to present in the visual graph a node representing the second dataset and one or more edges between the node representing the second dataset and the one or more nodes representing the first set of one or more datasets, each edge of the one or more edges between the node representing the second dataset and the one or more nodes representing the first set of one or more datasets representing a data dependency of a respective dataset of the first set of one or more datasets on the second dataset.

8. One or more non-transitory storage media storing one or more sequences of instructions which, when executed by one or more processors, cause performance of:
    parsing operations of a first analysis object for visualizing data to identify datasets to be visualized via the operations;
    determining, based on the parsing, first dataset dependency information for the first analysis object,
    the first dataset dependency information identifying a first set of one or more datasets to which the operations apply and on which the first analysis object depends, each dataset of the first set of one or more datasets contained in one or more data files stored in a storage media,
    using the first dataset dependency information to cause a visual graph to be presented in a computer graphical user interface, the visual graph comprising one or more nodes representing the first set of one or more datasets and a node representing the first analysis object and one or more edges between the one or more nodes representing the first set of one or more datasets and the node representing the first analysis object, each edge of the one or more edges representing a data dependency of the first analysis object on a respective dataset of the first set of one or more datasets.

9. The one or more non-transitory storage media of claim 8, wherein the parsed operations of the first analysis object comprise PYTHON programming language instructions for analyzing the first set of one or more datasets, a JavaScript Object Notation (JSON) representation of operations to apply to the first set of one or more datasets, or HyperTextMarkupLanguage (HTML) code for generating a document based on the first set of one or more datasets.

10. The one or more non-transitory storage media of claim 8, wherein the node of the presented visual graph representing the first analysis object has a distinct visual appearance in the computer graphical user interface from the one or more nodes of the presented visual graph representing the first set of one or more datasets so as to visually indicate that the node representing the first analysis object represents an analysis object and not a dataset.

11. The one or more non-transitory storage media of claim 8, wherein the parsed operations of the first analysis object comprise programming language instructions for analyzing the first set of one or more datasets selected from the group consisting of MATLAB, R, C, C++, OBJECTIVE-C, JAVA, or SQL programming language instructions.

12. The one or more non-transitory storage media of claim 8, the operations including comments on visualizations of underlying data in the one or more datasets or interval selection of the underlying data in the one or more datasets.

13. The one or more non-transitory storage media of claim 12, wherein the processing the operations of the first analysis object to cause a visualization of the first set of one or more datasets to be presented in the computer graphical user interface is performed in response to detecting a user input directed to the node of the presented visual graph representing the first analysis object.

14. The one or more non-transitory storage media of claim 8, further storing instructions which, when executed by the one or more processors, cause performance of:
    determining second dataset dependency information for the first set of one or more datasets, the second dataset dependency information identifying a second dataset on which the first set of one or more datasets depend, the second dataset contained in one or more data files stored in a storage media; and
    using the second dataset dependency information to present in the visual graph a node representing the second dataset and one or more edges between the node representing the second dataset and the one or more nodes representing the first set of one or more datasets, each edge of the one or more edges between the node representing the second dataset and the one or more nodes representing the first set of one or more datasets representing a data dependency of a respective dataset of the first set of one or more datasets on the second dataset.

15. A computing system comprising:
    one or more processors;
    storage media; and
    instructions stored in the storage media and configured for execution by the one or more processors to perform:
    parsing operations of a first analysis object for visualizing data to identify datasets to be visualized via the operations;
    determining, based on the parsing, first dataset dependency information for the first analysis object,
    the first dataset dependency information identifying a first set of one or more datasets to which the operations apply and on which the first analysis object depends, each dataset of the first set of one or more datasets contained in one or more data files stored in a storage media,
    using the first dataset dependency information to cause a visual graph to be presented in a computer graphical user interface and one or more nodes representing the first set of one or more datasets and a node representing the first analysis object, the visual graph further comprising one or more edges between the one or more nodes representing the first set of one or more datasets and the node representing the first analysis object, each edge of the one or more edges representing a data dependency of the first analysis object on a respective dataset of the first set of one or more datasets.

16. The computing system of claim 15, wherein the parsed operations of the first analysis object comprise PYTHON programming language instructions for analyzing the first set of one or more datasets, a JavaScript Object Notation (JSON) representation of operations to apply to the first set of one or more datasets, or HyperTextMarkupLanguage (HTML) code for generating a document based on the first set of one or more datasets.

17. The computing system of claim 15, wherein the node of the presented visual graph representing the first analysis object has a distinct visual appearance in the computer graphical user interface from the one or more nodes of the presented visual graph representing the first set of one or more datasets so as to visually indicate that the node representing the first analysis object represents an analysis object and not a dataset.

18. The computing system of claim 15, wherein the parsed operations of the first analysis object comprise programming language instructions for analyzing the first set of one or more datasets selected from the group consisting of MATLAB, R, C, C++, OBJECTIVE-C, JAVA, or SQL programming language instructions.

19. The computing system of claim 15, the operations including comments on visualizations of underlying data in the one or more datasets or interval selection of the underlying data in the one or more datasets.

20. The computing system of claim 15, further comprising instructions stored in storage media and configured for execution by the one or more processors to perform:
    determining second dataset dependency information for the first set of one or more datasets, the second dataset dependency information identifying a second dataset on which the first set of one or more datasets depend, the second dataset contained in one or more data files stored in a storage media; and
    using the second dataset dependency information to present in the visual graph a node representing the second dataset and one or more edges between the node representing the second dataset and the one or more nodes representing the first set of one or more datasets, each edge of the one or more edges between the node representing the second dataset and the one or more nodes representing the first set of one or more datasets representing a data dependency of a respective dataset of the first set of one or more datasets on the second dataset.

* * * * *